US012241594B2

(12) United States Patent
Marquardt

(10) Patent No.: US 12,241,594 B2
(45) Date of Patent: Mar. 4, 2025

(54) CONSTANT HEADSPACE AMPOULE

(71) Applicant: Applied Materials, Inc., Santa Clara, CA (US)

(72) Inventor: David Marquardt, Scottsdale, AZ (US)

(73) Assignee: Applied Materials, Inc., Santa Clara, CA (US)

( * ) Notice: Subject to any disclaimer, the term of this patent is extended or adjusted under 35 U.S.C. 154(b) by 424 days.

(21) Appl. No.: 17/898,608

(22) Filed: Aug. 30, 2022

(65) Prior Publication Data

US 2024/0068619 A1 Feb. 29, 2024

(51) Int. Cl.
*C23C 16/448* (2006.01)
*F17C 3/00* (2006.01)

(52) U.S. Cl.
CPC ........ *F17C 3/00* (2013.01); *F17C 2201/0119* (2013.01); *F17C 2205/0311* (2013.01); *F17C 2205/0329* (2013.01); *F17C 2205/0391* (2013.01); *F17C 2260/024* (2013.01); *F17C 2270/0518* (2013.01)

(58) Field of Classification Search
CPC ............... B01F 29/253; B01F 2101/58; C23C 16/4481; F17C 3/00; F17C 2201/0119; F17C 2205/0311; F17C 2205/0329; F17C 2205/0391; F17C 2260/024; F17C 2270/0518
See application file for complete search history.

(56) References Cited

U.S. PATENT DOCUMENTS

| | | | | |
|---|---|---|---|---|
| 5,589,110 | A * | 12/1996 | Motoda | C23C 16/4482 261/61 |
| 6,443,435 | B1 | 9/2002 | Hendrickson | |
| 8,235,364 | B2 * | 8/2012 | Sarigiannis | C23C 16/4482 141/63 |
| 10,563,305 | B2 * | 2/2020 | Nehlsen | C23C 16/45563 |
| 11,166,441 | B2 * | 11/2021 | Birtcher | B65D 51/24 |
| 2005/0249873 | A1 | 11/2005 | Sarigiannis | |

* cited by examiner

*Primary Examiner* — Charles S Bushey
(74) *Attorney, Agent, or Firm* — Servilla Whitney LLC

(57) ABSTRACT

Ampoules including a housing, a lid and a floating structure are described. The floating structure includes a float with a volume determined to displace a predetermined volume of liquid within the ampoule. An outlet channel extends from the top surface of the float. A baffle is positioned along the length of the outlet channel and creates a saturation zone between the baffle and the float.

20 Claims, 7 Drawing Sheets

100

CONSTANT HEADSPACE AMPOULE

TECHNICAL FIELD

Embodiments of the disclosure generally relate to apparatus and methods for delivering precursors. More particularly, embodiments of the disclosure are directed to ampoules having constant headspace for uniform precursor delivery to processing chambers.

BACKGROUND

In a semiconductor wafer processing chamber, such as an atomic layer deposition (ALD) chamber, it is useful to control the delivery of precursor during deposition. Changes in precursor concentration during the deposition process can result in non-uniform film deposition.

During processing, precursor molecules are delivered to a processing chamber in a gaseous state. For liquid precursors, a flow of a carrier gas, typically an inert gas, is passed through an ampoule containing the precursor. The precursor molecules in the headspace are swept up in the stream of carrier gas and flow to the processing chamber. The headspace, also referred to as a saturation zone, can change due to use of the precursor or refilling of the ampoule so that the overall size of the saturation zone varies during deposition processes. As the level of liquid in the ampoule changes, the volume of the headspace changes causing variations in the concentration of the precursor in the carrier gas resulting in deposition non-uniformity.

There is, therefore, a need in the art for apparatus and methods to improve precursor concentration uniformity during deposition processes.

SUMMARY

One or more embodiments of the disclosure are directed to ampoules comprising a housing, a lid, and a floating structure. The housing has a sidewall and a bottom. The lid is positioned on a top surface of the sidewall. The lid has an inlet opening and an outlet opening. The floating structure is within the housing and comprises a float, and outlet channel, and a baffle. The float has a top surface and a volume configured to displace a predetermined volume of liquid so that the top surface of the float remains a depth below a surface of the liquid. The outlet channel extends from a top surface of the float. A baffle has a top surface and a bottom surface defining a thickness of the baffle. The baffle is positioned along a length of the outlet channel to create a saturation zone between the bottom surface of the baffle and the surface of the liquid. At least one opening is in the outlet channel between the top surface of the float and the bottom surface of the baffle.

Additional embodiments of the disclosure are directed to ampoules comprising a housing, a lid, and a floating structure. The housing has a sidewall and a bottom. The lid is positioned on a top surface of the sidewall. The lid has an inlet opening and an outlet opening. An outlet opening extension extends a distance from the bottom surface of the lid. The outlet opening extension has an inner diameter. A guide pin extends from the bottom surface of the lid. The floating structure is within the housing. The floating structure comprises a float having a top surface and volume. The volume is configured to displace a predetermined volume of liquid so that the top surface of the float remains a depth below a surface of the liquid. An outlet channel extends from the top surface of the float. The outlet channel fits within the inner diameter of the outlet opening extension of the lid. A baffle having a top surface and a bottom surface defining a thickness of the baffle is positioned along a length of the outlet channel to create a saturation zone between the bottom surface of the baffle and the surface of the liquid. At least one opening is in the outlet channel between the top surface of the float and the bottom surface of the baffle. A guide pin sleeve has a complementary shape to the guide pin extends from the top surface of the baffle. The guide pin sleeve is configured to maintain alignment of the floating structure during use. The volume of the float is in fluid communication with the outlet channel and internal walls extend from the top of the float within the outlet channel to a height above the baffle.

Further embodiments of the disclosure are directed to ampoules comprising a housing, a lid, and a floating structure. The housing has a sidewall and a bottom. The lid is positioned on a top surface of the sidewall and has an inlet opening and an outlet opening. The floating structure is within the housing. The float has a top surface and a volume configured to displace a predetermined volume of liquid so that the top surface of the float remains a depth below a surface of the liquid. An outlet channel extends from a top surface of the float. The baffle has an inner portion and an outer portion. The outer portion extends parallel to the top surface of the float. The inner portion extends from the outer portion toward the lid. The baffle is positioned along a length of the outlet channel to create a saturation zone between the bottom surface of the baffle and the surface of the liquid. At least one opening is in the outlet channel between the top surface of the float and the bottom surface of the baffle.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

As used in this specification and appended claims, use of relative terms like "above" and "below" should not be taken as limiting the scope of the disclosure to a physical orientation in space. Accordingly, use of relative terms should not be limited to the direction specified by gravity.

Embodiments of the disclosure provide apparatus and methods that provide consistent precursor saturation with varying liquid chemistry height. Some embodiments employ the use of a displaced volume that matches the buoyancy of the ampoule chemistry. One or more embodiments have a flow zone that promotes the saturation of carrier gas with ampoule chemistry. In one or more embodiments, the saturation zone geometric configuration remains the same with changing liquid heights.

Some embodiments of the disclosure reduce the impact of output dose variation due the changing height of ampoule liquid chemistry. Liquid level heights are lowered when chemistry is consumed, and some ampoule applications also have an automated refill capability where fluid heights are raised. One or more embodiments provide a constant saturation zone where incoming carrier gas flows across the liquid chemistry that does not change with overall ampoule liquid heights because the flow structure floats with the surface. Some embodiments incorporate a structure that floats with the liquid surface to maintain constant headspace and constant saturation zone volume.

Some embodiments advantageously provide chemistry ampoules that enable delivery of a constant concentration of saturated gas. Some embodiments advantageously provide apparatus and/or methods that enable a repeatable dose of chemistry to be delivered to deposition chambers and onto the semiconductor wafer surface. Some embodiments provide repeatable deposition rates from wafer to wafer and tool to tool.

Figure 1:
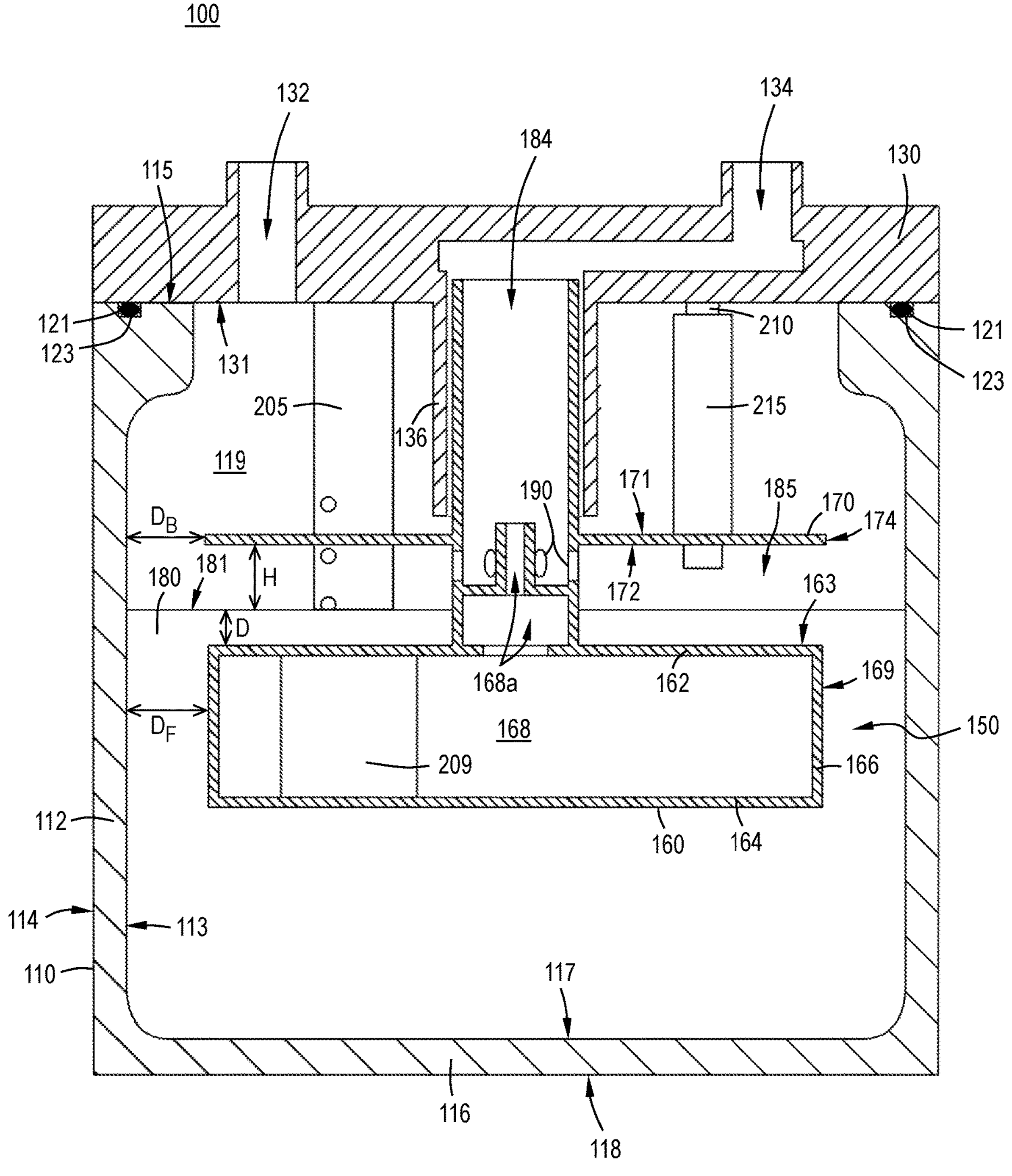
FIG. 1 illustrates a schematic cross-sectional view of an ampoule according to one or more embodiments of the disclosure.
Figure 2:
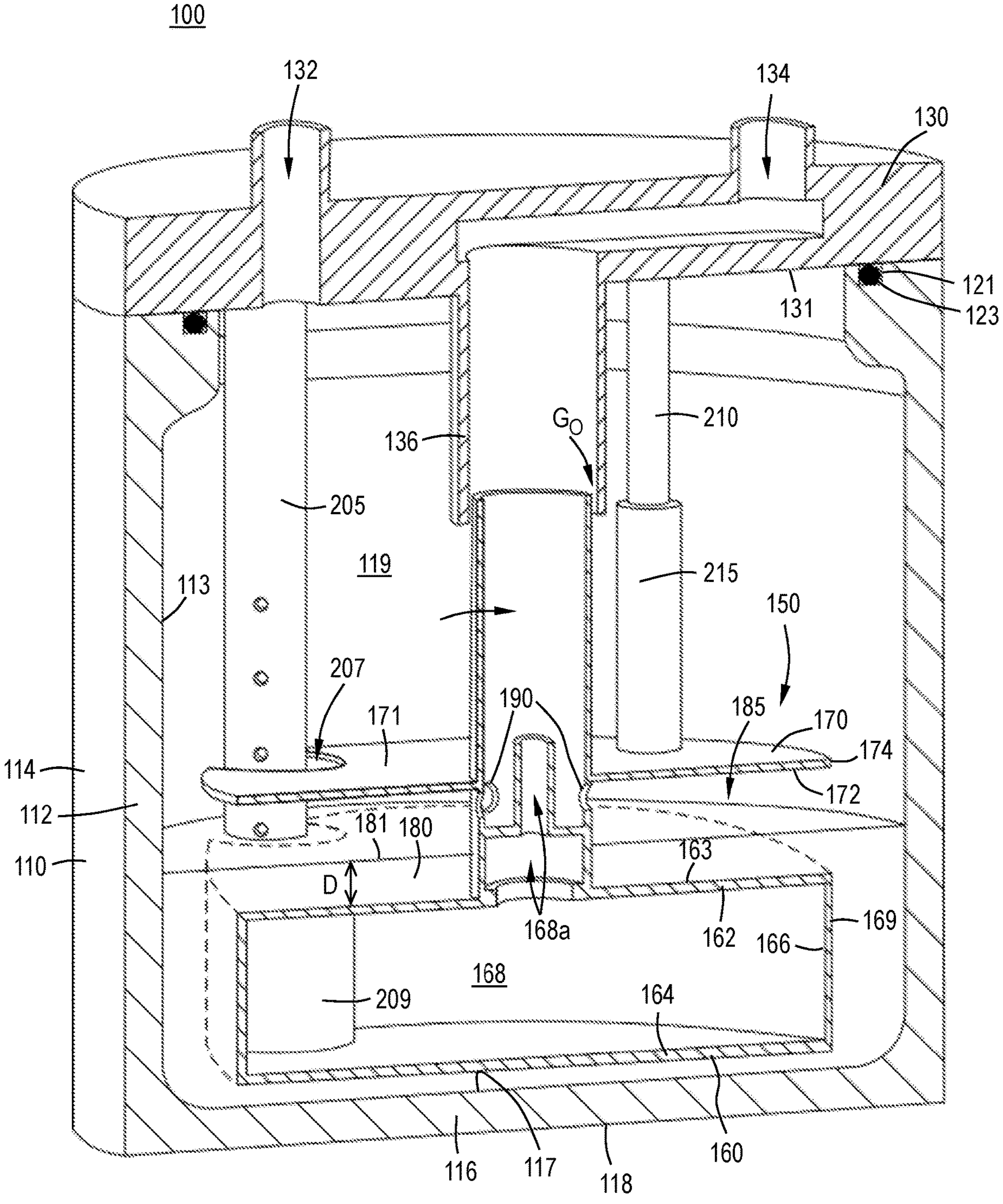
FIG. 2 illustrates a schematic cross-sectional perspective view of an ampoule according to one or more embodiment of the disclosure.

Referring to FIGS. 1 and 2, one or more embodiments of the disclosure are directed to ampoules 100 for precursor delivery. FIG. 1 illustrates a cross-sectional view of an ampoule according to one or more embodiment of the disclosure. FIG. 2 illustrates a cross-sectional orthographic view of the ampoule of FIG. 1 with a decreased level of liquid.

The ampoule 100 includes a housing 110 having sidewall 112 and a bottom 116. The illustrated ampoule 100 is a generally cylindrically shaped component having one sidewall. Embodiments having different shapes may have more than one sidewall and are within the scope of the disclosure. The sidewall 112 has an inner surface 113 with an inner diameter and an outer surface 114 with an outer diameter. The bottom 116 has an inner face 117 and an outer face 118.

A lid 130 is positioned on a top surface 115 of the sidewall 112. In some embodiments, an O-ring 121 is positioned between the top surface 115 of the sidewall 112 and the lid 130 to maintain a sealed environment within the interior 119 of the ampoule 100. In some embodiments, the O-ring 121 is positioned within a groove 123 formed in the top surface 115 of the sidewall 112, or in the bottom surface 131 of the lid 130. The lid 130 has an inlet opening 132 that extends through the thickness of the lid 130. The lid 130 also has an outlet opening 134 that extends through the thickness of the lid 130.

Figure 3:
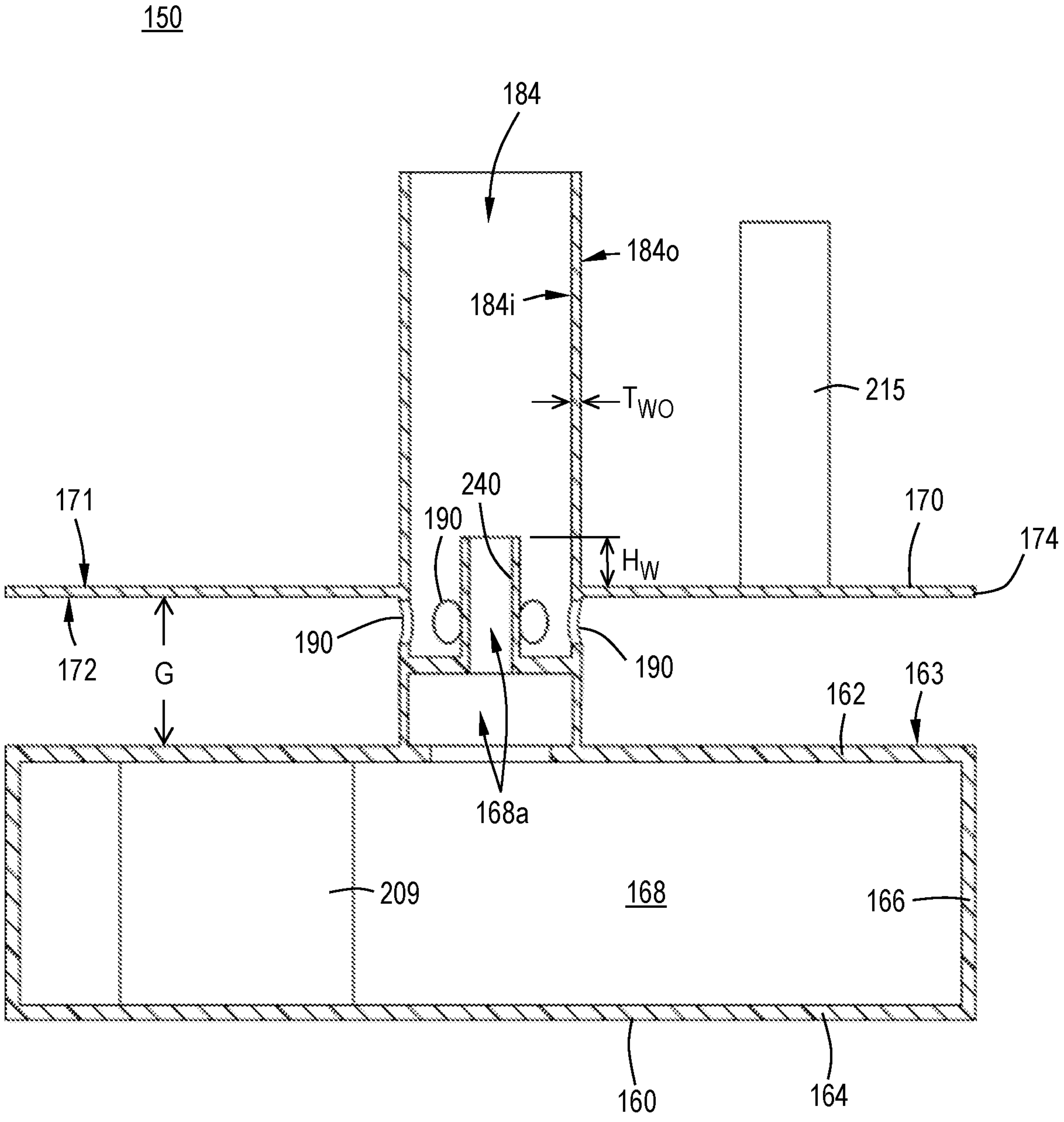
FIG. 3 illustrates a schematic cross-sectional view of a floating structure for use with an ampoule according to one or more embodiment of the disclosure.

With reference to FIGS. 1 through 3, a floating structure 150 is within the housing 110 and is configured to float within a liquid within the interior 119 of the ampoule 100. The floating structure 150 comprises a float 160 and a baffle 170. The float 160 has a top wall 162 with a top surface 163, a bottom wall 164 and a sidewall 166 defining the outer boundaries of a volume 168.

The volume 168 (including the top wall 162, bottom wall 164 and sidewall 166) is configured to displace a predetermined volume of liquid so that the top surface 163 of the top wall 162 of the float 160 remains a depth D below the surface 181 of a liquid 180 within the ampoule 100. The volume that the float 160 occupies depends on the thickness and overall size of the walls and the size of the volume 168. In some embodiments, the float 160 remains a substantially uniform depth D below the surface 181 of the liquid 180 as the overall volume of the liquid 180 changes. For example, the embodiment illustrated in FIG. 1 has a larger volume of liquid 180 than the embodiment illustrated in FIG. 2 even though the depth D remains substantially the same. As used in this manner, a "substantially uniform depth" or the depth remaining "substantially the same" means that the depth below the surface 181 of the liquid 180 is within ±10% of the average depth D of the float 160. The average depth is measured from the maximum fill volume to the minimum fill volume of the ampoule 100 where the floating structure 150 is not contacting the lid 130 or the bottom 116.

The float 160 includes an outlet channel 184 that extends from the top surface 163 of the top wall 162. The outlet channel 184 is aligned with the outlet opening 134 of the lid 130.

Figure 7:
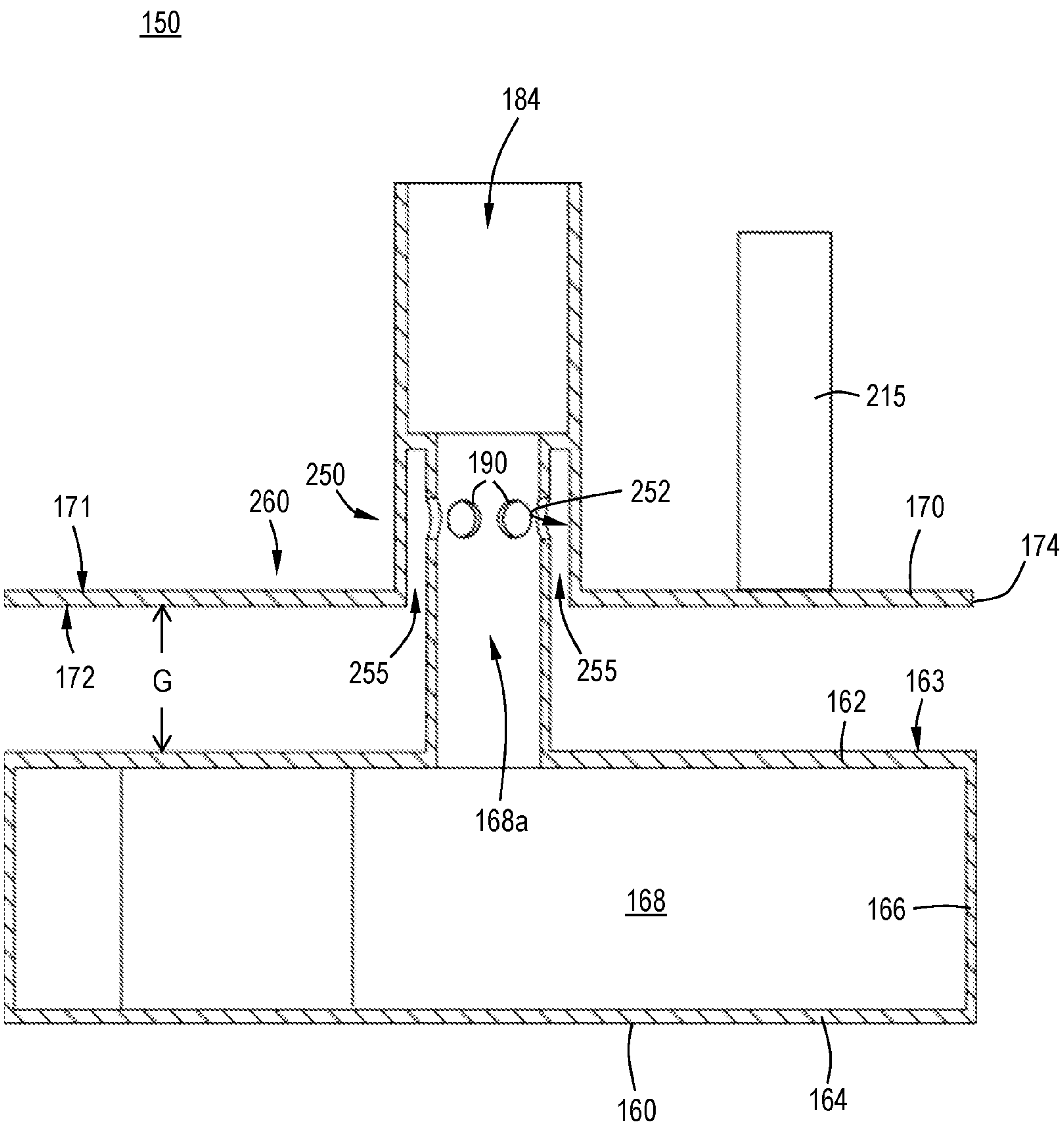
FIG. 7 illustrates a schematic cross-sectional view of a floating structure for use with an ampoule according to one or more embodiment of the disclosure.

The float 160 of some embodiments includes an upper volume **168*a*, as shown in FIGS. 1 and 7. The upper volume 168*a* of some embodiments is sized to prevent liquid from getting into the volume 168 during transportation/installation, as liquid getting into the volume 168 would counteract volume 168 buoyancy and may present other deleterious effects to the process due to formation of another liquid reservoir. In some embodiments, volume 168 is open to the outlet channel 184 to permit evacuation of gasses trapped in the volume 168. In some embodiments, upper volume 168*a* is included with volume 168 in controlling buoyancy of the floating structure 150. In some embodiments, upper volume 168*a* is not included with volume 168 in controlling buoyancy of the floating structure 150 and remains above the surface of the liquid within the interior 119. The baffle 170 has a top surface 171 and a bottom surface 172 defining a thickness of the baffle 170. The baffle is positioned along the length of the outlet channel 184 so that there is a gap G between the bottom surface 172 of the baffle 170 and the top surface 163 of the top wall 162 of the float 160. The bottom surface 172 of the baffle 170 is spaced a height H above the surface 181 of the liquid 180 within the ampoule 100. The gap H between the top surface 181 of the liquid 180 and the bottom surface 172 of the baffle 170 creates a saturation zone 185 where gas flowing through the ampoule 100** can become saturated with gaseous precursor molecules.

At least one opening 190 is formed in the outlet channel 184 between the top surface 163 of the float 160 and the bottom surface 172 of the baffle 170. In some embodiments when there are multiple openings 190, the openings 190 are equally spaced around the periphery of the outlet channel 184. In some embodiments, the volume of the openings 190 vary with location on the around the outlet channel 184 to balance gas conductance from the inlet 132. For example, the openings 190 on the same side of the outlet channel 184 as the inlet 132 in some embodiments are smaller than the openings 190 on the opposite side of the outlet channel 184 from the inlet 132 to account for the different distances that a gas has to travel from the inlet 132 to the individual openings 190. In some embodiments, the openings 190 in the outlet channel 184 are sized to provide flow restriction on a side of the outlet channel 184 opposite the inlet 132 in the lid 130.

The size of the baffle 170 is configured so that an outer peripheral edge 174 of the baffle 170 is spaced a distance $D_B$ from the inner surface 113 of the sidewall 112 of the housing 110. In some embodiments, the distance $D_B$ is in the range of ¼ inch to 1 inch.

The size of the float 160 is configured so that an outer peripheral face 169 of the float 160 is spaced a distance $D_F$ from the inner surface 113 of the sidewall 112 of the housing 110. In some embodiments, the distance $D_F$ is in the range of ¼ inch to 1 inch.

Figure 4:
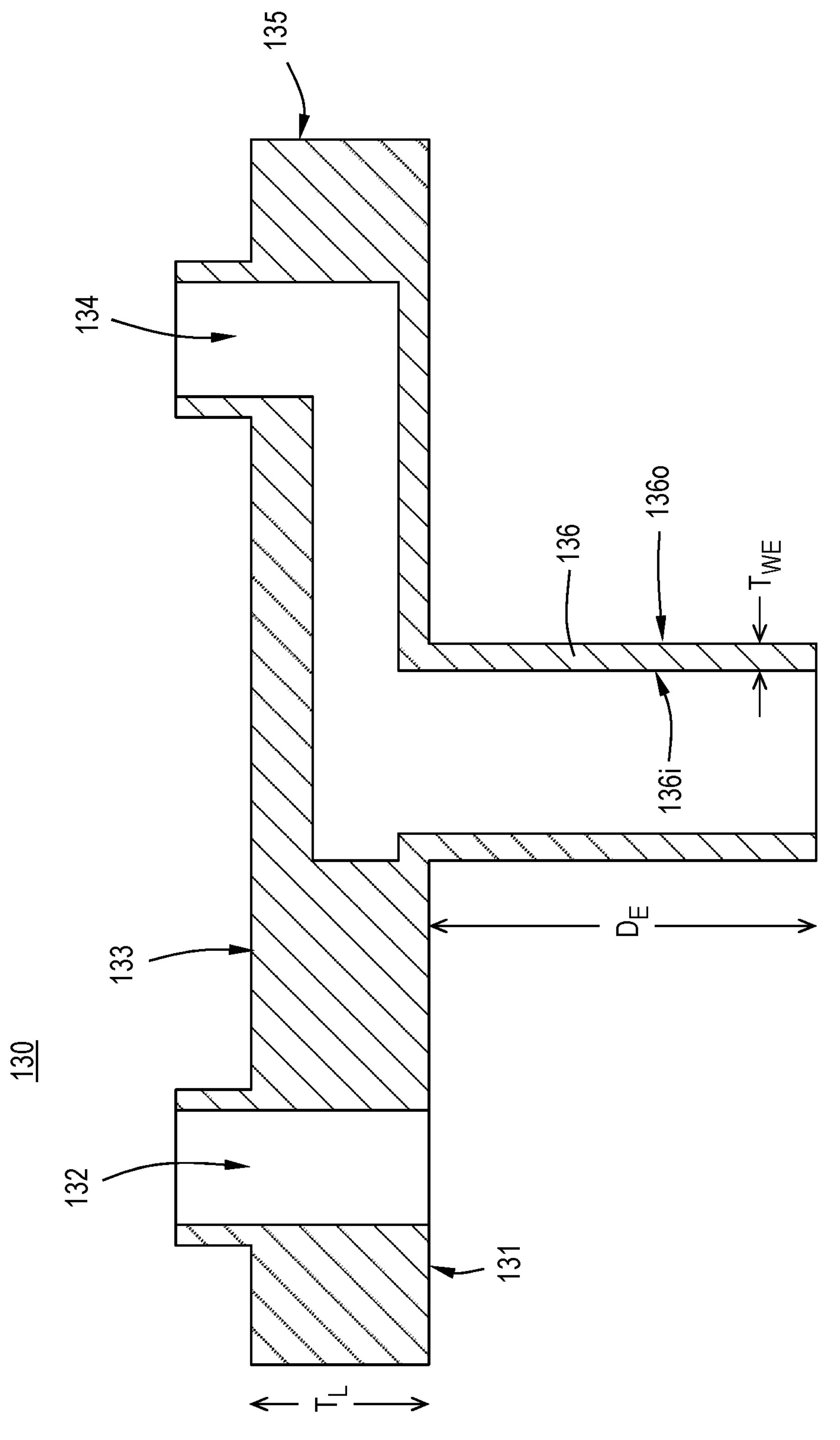
FIG. 4 illustrates a cross-sectional schematic view of an ampoule lid according to one or more embodiments of the disclosure.

With reference to FIGS. 1, 2 and 4, the lid 130 has a top surface 133 and a bottom surface 131 that define a thickness $T_L$ of the lid 130. The lid has an outer peripheral face 135 defining the outer boundary of the lid 130. The inlet opening 132 extends through the thickness $T_L$ of the lid 130. The outlet opening 134 also extends through the thickness $T_L$ of the lid 130. In the illustrated embodiment, the inlet opening 132 and outlet opening 134 extend a distance from the top surface 133 of the lid 130. However, the skilled artisan will recognize that this is merely representative of one possible configuration and should not be taken as limiting the scope of the disclosure. In some embodiments, one or more of the inlet opening 132 or outlet opening 134 are flush with the top surface 133 of the lid 130. In some embodiments, an auxiliary piece is attached to the top surface 133 of the lid 130 by any suitable technique to allow for connection of inlet or outlet lines to the inlet opening 132 or outlet opening 134.

In the illustrated embodiment, the outlet opening 134 extends along a multi-leg pathway through the thickness $T_L$ of the lid 130. The illustrated multi-leg pathway forms an opening in the bottom surface 131 of the lid 130 at the approximate center of the lid 130 mass with an opening in the top surface 133 near the periphery of the lid 130 mass. The multi-leg pathway illustrated has a central vertical section forming an opening in the bottom surface 131 of the lid 130, an outer vertical section forming an opening in the top surface 133 of the lid 130 and a horizontal section connecting the two vertical sections.

In some embodiments of the lid 130 further comprises an outlet opening extension 136. The outlet opening extension 136 extends a distance $D_E$ from the bottom surface 131 of the lid 130. The outlet opening extension 136 has an inner surface **136*i* with an inner diameter and an outer surface 136*o* with an outer diameter forming a wall thickness $T_{WE}$ of the outlet opening extension 136. The distance $D_E$ that the outlet opening extension 136 extends from the bottom surface 131 of the lid 130 can vary depending on, for example, the depth of the housing 110 and the length of the outlet channel 184 of the floating structure 150**.

Referring again to FIGS. 1 to 3, the outlet channel 184 of the floating structure 150 has an inner surface **184*i* with an inner diameter and an outer surface 184*o* with an outer diameter forming a wall thickness $T_{WO}$ of the outlet channel 184. The outlet channel 184 of some embodiments has an outer diameter configured to fit within the inner diameter of the outlet opening extension 136 of the lid 130. In some embodiments, there is a gap $G_O$ between the outer surface 184*o* of the outlet channel 184 of the floating structure 150 and the inner diameter of the outlet channel extension 136 formed by the inner surface 136*i* of the outlet channel extension 136. The gap $G_O$ is configured to allow the floating structure 150 to move vertically within the housing 110** during use of the liquid precursor without causing excessive friction that could cause particulate formation. In some embodiments, the gap $G_O$ is in the range of 0.25 to 4 mm, or in the range of 0.5 to 3 mm, or in the range of 0.75 to 2 mm.

The embodiments illustrated in FIGS. 1, 2, 5 and 7 show the outlet channel 184 within the inner diameter of the outlet channel extension 136 of the lid 130. In some embodiments, the arrangement of these components are reversed so that the outlet channel extension 136 of the lid 130 is within the inner diameter of the outlet channel 184 of the floating structure 150. In embodiments of this sort, the gap between the inner surface **184*i* of the outlet channel 184 and the outer surface 136*o* of the outlet channel extension 136 of the lid 130 is configured to allow the floating structure 150 to move vertically within the housing 110 during use of the liquid precursor without causing excessive friction that might form particulates or contaminate the precursor. In some embodiments, the gap between the inner surface 184*i* of the outlet channel 184 and the outer surface 136*o* of the outlet channel extension 136 of the lid 130** is in the range of 0.25 to 4 mm, or in the range of 0.5 to 3 mm or in the range of 0.75 to 2 mm.

Figure 5:
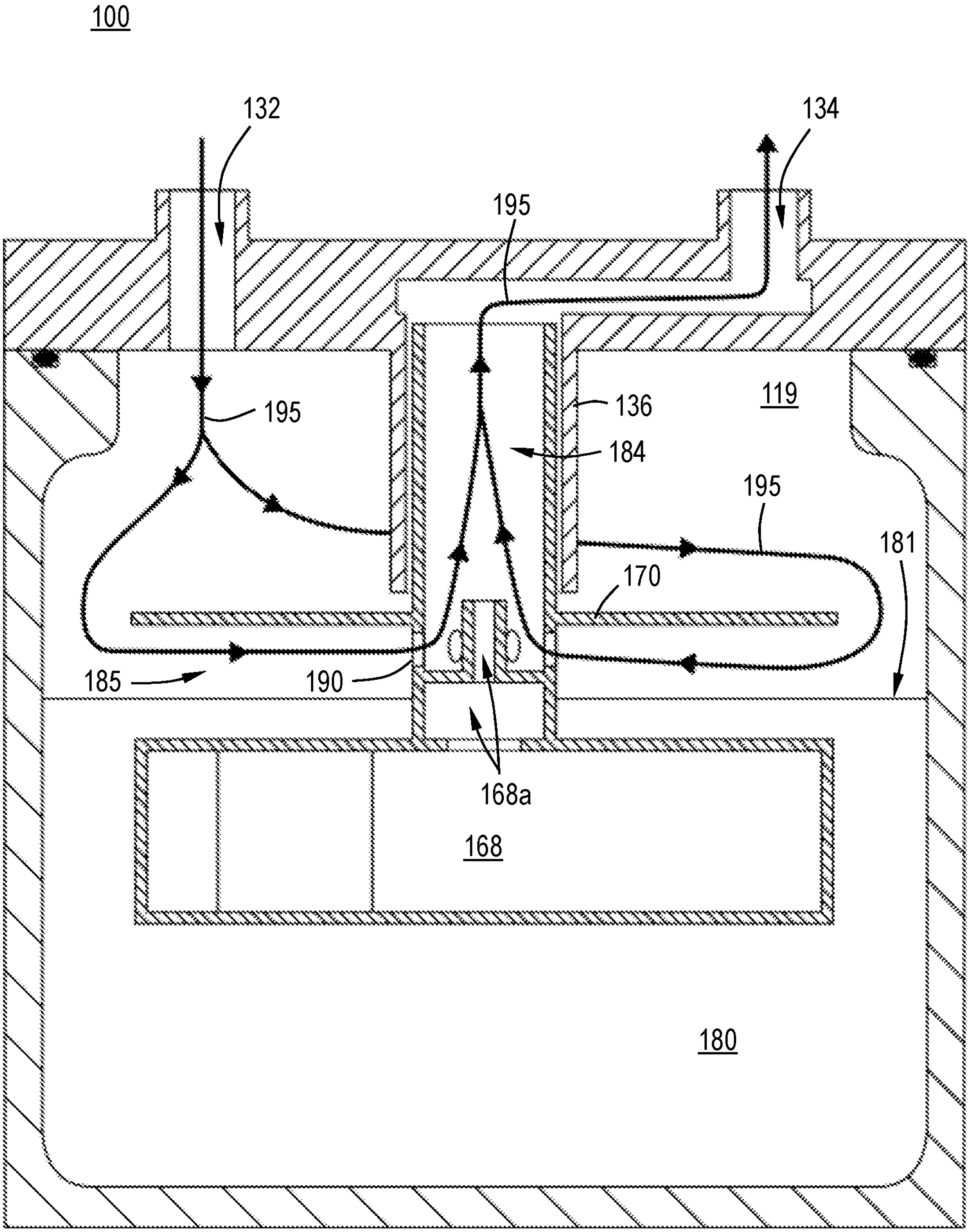
FIG. 5 illustrates a schematic cross-sectional view of an ampoule and a gas flow path according to one or more embodiments of the disclosure.

FIG. 5 shows a schematic representation of an ampoule 100 according to one or more embodiment of the disclosure. FIG. 5 shows the flow path 195 of a gas according to one or more embodiment as the gas passes through the ampoule 100. The gas enters the ampoule 100 through inlet opening 132 and flow around the interior 119 of the ampoule 100. The flow path 195 goes around the baffle 170 into the saturation zone 185 between the bottom surface 172 of the baffle 170 and the top surface 181 of the liquid 180. In the saturation zone 185, the gas picks up molecules of the liquid 180 that have entered the vapor phase. The gas passes through openings 190 into the outlet channel 184 and exits the ampoule 100 through the outlet opening 134. In some embodiments, the saturation zone has a height H in the range of 1 mm to 25 mm, or in the range of 2 mm to 20 mm, or in the range of 5 mm to 15 mm.

Referring back to FIGS. 1 and 2, the ampoule 100 of some embodiments further comprises a liquid level detector 205 within the housing 110. The liquid level detector 205 can be any suitable liquid level detector 205 known to the skilled artisan. In some embodiments, the baffle 170 further comprises a cutout 207 shaped to conform to the liquid level detector 205. In some embodiments, the float 160 further comprises a cutout 209 shaped to conform to the liquid level detector 205. The cutout 207, 209 is sized to allow the floating structure 150 to move vertically within the housing 110 during use of the ampoule without contacting the liquid level detector 205.

In some embodiments, the lid 130 further comprises a guide pin 210 extending from the bottom surface 131 of the lid 130. The guide pin 210 illustrated is a cylindrical shaped protrusion from the bottom surface 131 of the lid 130. However, the skilled artisan will recognize that this is merely one possible configuration and should not be taken as limiting the scope of the disclosure. The shape of the guide pin 210 can be any suitable shape including, but not limited to, those shapes having square, rectangular, triangular, pentagonal cross-sections (e.g., triangular prisms, rectangular prisms, etc.).

Figure 6A:
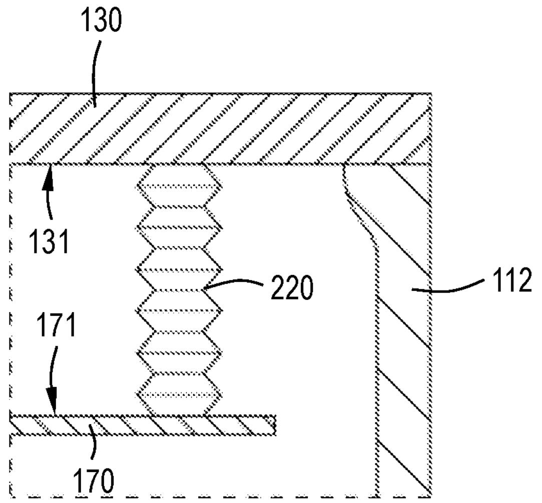
FIGS. 6A and 6B illustrates partial views of alignment components according to one or more embodiment of the disclosure.
Figure 6B:
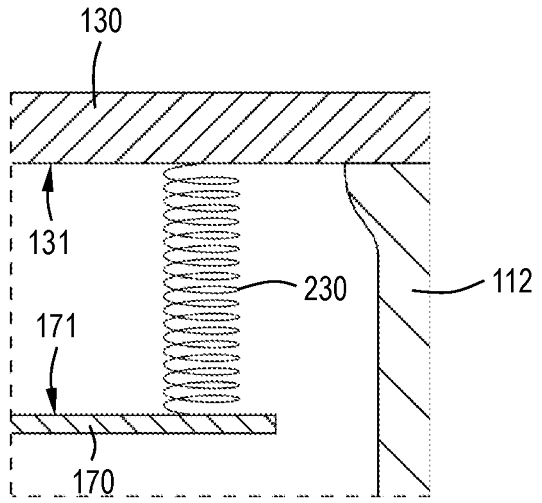

In some embodiments, the baffle 170 further comprises a guide pin sleeve 215. The guide pin sleeve 215 has a complementary shape to the guide pin 210 so that the guide pin sleeve 215 can slide along the length of the guide pin 210 during vertical movement of the floating structure 150. The guide pin sleeve 215 is configured to maintain alignment of the floating structure during vertical movement of the floating structure 150 during use of the ampoule so that as the floating structure moves vertically within the housing 110, the orientation of the floating structure 150 remains substantially the same. In some embodiments, as shown in FIGS. 6A and 6B, one or more of a bellows 220 or spring 230 connects the floating structure 150 with the lid 130 to maintain alignment of the floating structure during use.

In the illustrated embodiments, the guide pin 210 is connected to the lid 130 and the guide pin sleeve 215 is connected to the baffle 170. However, the skilled artisan will recognize that this is merely one possible configuration of these complementary components and that other arrangements are within the scope of the disclosure. In some embodiments, this configuration is reversed so that the guide pin 210 is connected to the baffle 170 and the guide pin sleeve 215 is connected to the lid 130.

Referring to FIG. 3, in some embodiments, the volume 168 of the float 160 is in fluid communication with the outlet channel 184. For example, in the illustrated embodiment, internal walls 240 extend from the top of the float 160 within the outlet channel 184 to a height $H_W$ above the baffle 170. In some embodiments, the height $H_W$ is in the range of 1 mm to 25 mm, or in the range of 2 mm to 20 mm, or in the range of 5 mm to 15 mm.

Referring to FIG. 7, in some embodiments of the floating structure 150, the baffle 170 has an inner portion 250 and an outer portion 260. The outer portion 260 extends parallel to the top surface 163 of the float 160. In inner portion 250 extends from the outer portion 260 toward the lid 130 and connects to the outlet channel 184 to create a gap 255 between the outlet channel 184 and an inner surface 252 of the inner portion 250. In some embodiments, the gap 255 is in the range of 1 mm to 15 mm, or in the range of 2 mm to 10 mm.

In the illustrated embodiment, the inner portion 250 of the baffle 170 is substantially parallel to the outlet channel 184. However, the skilled artisan will recognize that this is merely representative of one possible configuration and does not limit the disclosure to such an arrangement. In some embodiments, the inner portion 250 is angled relative to the outlet channel 184 so that the inner portion 250 slopes toward the outer portion 260 so that the gap 255 is narrower near the lid 130 than near the outer portion 260.

In some embodiments, as shown in FIG. 7, the openings 190 are located in the gap 255 along the length of the outlet channel 184 between the inner portion 250 and the outlet channel 184. Stated differently, in some embodiments, the openings 190 are closer to the lid 130 than the top surface 171 of the baffle 170.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein provided a description with reference to particular embodiments, it is to be understood that these embodiments are merely illustrative of the principles and applications of the disclosure. It will be apparent to those skilled in the art that various modifications and variations can be made to the present disclosure without departing from the spirit and scope thereof. Thus, it is intended that the present disclosure include modifications and variations that are within the scope of the appended claims and their equivalents.

What is claimed is:

1. An ampoule comprising:

a housing having a sidewall and a bottom;

a lid positioned on a top surface of the sidewall, the lid having an inlet opening and an outlet opening;

a floating structure within the housing, the floating structure comprising a float having a top surface and volume, the volume configured to displace a predetermined volume of liquid so that the top surface of the float remains a depth below a surface of the liquid, an outlet channel extending from a top surface of the float, a baffle having a top surface and a bottom surface defining a thickness of the baffle, the baffle positioned along a length of the outlet channel to create a saturation zone between the bottom surface of the baffle and the surface of the liquid, and at least one opening in the outlet channel between the top surface of the float and the bottom surface of the baffle.

2. The ampoule of claim 1, wherein the baffle has an outer peripheral edge spaced a distance from the sidewall of the housing.

3. The ampoule of claim 2, wherein the distance is in the range of ¼ to 1 inch.

4. The ampoule of claim 1, wherein the lid further comprises an outlet opening extension that extends a distance from a bottom surface of the lid, the outlet opening extension having an inner diameter.

5. The ampoule of claim 4, wherein the outlet channel of the floating structure fits within the inner diameter of the outlet opening extension of the lid.

6. The ampoule of claim 5, wherein there is a gap between an outer surface of the outlet channel of the floating structure and the inner diameter of the outlet opening extension in the range of 0.25 to 4 mm.

7. The ampoule of claim 1, wherein the saturation zone has a height in the range of 1 mm to 25 mm.

8. The ampoule of claim 1, further comprising a liquid level detector within the housing.

9. The ampoule of claim 8, wherein the baffle further comprises a cutout shaped to conform to the liquid level detector.

10. The ampoule of claim 8, wherein the float further comprises a cutout shaped to conform to the liquid level detector.

11. The ampoule of claim 1, wherein the lid further comprises a guide pin extending from the bottom surface of the lid.

12. The ampoule of claim 11, wherein the baffle further comprises a guide pin sleeve having a complementary shape to the guide pin, the guide pin sleeve configured to maintain alignment of the floating structure during use.

13. The ampoule of claim 1, further comprising one or more of a bellows or spring connecting the floating structure with the lid to maintain alignment of the floating structure during use.

14. The ampoule of claim 1, wherein the openings in the outlet channel are sized to provide flow restriction on a side of the outlet channel opposite the inlet in the lid.

15. The ampoule of claim 1, wherein the volume of the float is in fluid communication with the outlet channel.

16. The ampoule of claim 15, wherein internal walls extend from the top of the float within the outlet channel to a height above the baffle.

17. The ampoule of claim 1, wherein the baffle has an inner portion and an outer portion, the outer portion extending parallel to the top surface of the float, the inner portion extending from the outer portion toward the lid and connecting to the outlet channel to create a gap between the outlet channel and an inner surface of the inner portion.

18. The ampoule of claim 17, wherein the openings are located in the gap along the length of the outlet channel between the inner portion and the outlet channel.

19. An ampoule comprising:

a housing having a sidewall and a bottom;

a lid positioned on a top surface of the sidewall, the lid having an inlet opening and an outlet opening, the lid having an outlet opening extension that extends a distance from a bottom surface of the lid, the outlet opening extension having an inner diameter, a guide pin extends from the bottom surface of the lid;

a floating structure within the housing, the floating structure comprising a float having a top surface and volume, the volume configured to displace a predetermined volume of liquid so that the top surface of the float remains a depth below a surface of the liquid, an outlet channel extending from a top surface of the float, the outlet channel fitting within the inner diameter of the outlet opening extension of the lid, a baffle having a top surface and a bottom surface defining a thickness of the baffle, the baffle positioned along a length of the outlet channel to create a saturation zone between the bottom surface of the baffle and the surface of the liquid, and at least one opening in the outlet channel between the top surface of the float and the bottom surface of the baffle, a guide pin sleeve having a complementary shape to the guide pin extends from the top surface of the baffle, the guide pin sleeve configured to maintain alignment of the floating structure during use, the volume of the float is in fluid communication with the outlet channel and internal walls extend from the top of the float within the outlet channel to a height above the baffle.

20. An ampoule comprising:

a housing having a sidewall and a bottom;

a lid positioned on a top surface of the sidewall, the lid having an inlet opening and an outlet opening;

a floating structure within the housing, the floating structure comprising:

a float having a top surface and volume, the volume configured to displace a predetermined volume of liquid so that the top surface of the float remains a depth below a surface of the liquid, an outlet channel extending from a top surface of the float, a baffle having an inner portion and an outer portion, the outer portion extending parallel to the top surface of the float, the inner portion extending from the outer portion toward the lid, the baffle positioned along a length of the outlet channel to create a saturation zone between the bottom surface of the baffle and the surface of the liquid, and at least one opening in the outlet channel between the top surface of the float and the bottom surface of the baffle.

* * * * *